United States Patent [19]
Vali et al.

[11] Patent Number: 5,291,032
[45] Date of Patent: Mar. 1, 1994

[54] FIBER OPTIC EVANESCENT WAVE FUEL GAUGE AND LEAK DETECTOR USING ECCENTRIC CORE FIBERS

[75] Inventors: Victor Vali, Laguna Hills; David B. Chang, Tustin; I-Fu Shih, Los Alamitos; Albert F. Lawrence, San Diego, all of Calif.

[73] Assignee: Hughes Aircraft Company, Los Angeles, Calif.

[21] Appl. No.: 59,714

[22] Filed: May 11, 1993

Related U.S. Application Data

[63] Continuation of Ser. No. 752,244, Aug. 21, 1991, abandoned.

[51] Int. Cl.$^5$ .............................................. G01N 15/06
[52] U.S. Cl. ...................... 250/577; 250/907; 250/227.21; 340/619
[58] Field of Search ........... 250/577, 904, 907, 227.21, 250/227.23, 227.25; 73/293; 340/604, 605, 619

[56] References Cited

U.S. PATENT DOCUMENTS

| | | | |
|---|---|---|---|
| 4,287,427 | 9/1991 | Scifres | 250/577 |
| 5,005,005 | 4/1991 | Brossia et al. | 250/573 |
| 5,058,420 | 10/1991 | Vali et al. | 250/577 |
| 5,077,482 | 12/1991 | Vali et al. | 250/577 |

*Primary Examiner*—David C. Nelms
*Assistant Examiner*—K. Shami
*Attorney, Agent, or Firm*—Georgann S. Grunebach; Terje Gudmestad; W. K. Denson-Low

[57] ABSTRACT

An optical fiber evanescent wave fuel sensor, employing a light source with a wavelength selected to be at the strong infrared absorption lines of the fuel, typically hydrocarbons. The amount of light leaking from the optical fiber is an exponential function of the length of the fiber in the liquid, and is independent of the relative indices of refraction of the fuel and fiber cladding material.

13 Claims, 2 Drawing Sheets

FIBER OPTIC EVANESCENT WAVE FUEL GAUGE AND LEAK DETECTOR USING ECCENTRIC CORE FIBERS

This is a continuation of application Ser. No. 07/752,244, filed Aug. 21, 1991, abandoned.

BACKGROUND OF THE INVENTION

The present invention relates to liquid level sensors and leak detectors for liquids held in a tank or container, such as a fuel tank.

The conventional device presently used to indicate the vehicle fuel tank level is the mechanical (float actuated) fuel gauge. Since it has mechanically moving parts, its reliability is relatively low. Moreover, the presence of mechanically moving parts and electrical connections to these parts can present a risk of unintentional fuel ignition, i.e., a fire hazard.

An evanescent wave absorption technique for measuring the length of a fiber immersed in a liquid is described in the issued and commonly assigned patent, number 5,077,482, issued Dec. 31, 1991, entitled "Fiber Optic Fuel and Liquid Gauge," by V. Vali et al., now U.S. Pat. No. 5,077,482, the entire contents of which are incorporated herein by this reference. When the cladding thickness of an optical fiber is only a few wavelengths of light, as in an eccentric core fiber, the evanescent wave extends outside the fiber cladding. If such a fiber is covered by or immersed in a liquid with index of refraction larger than that of the fiber cladding, some of the light leaks out of the fiber core. The effect can be used to determine the height of the liquid level in a container, as described in the referenced co-pending application.

The fiber evanescent wave fuel gauge (liquid level sensor) described in the referenced pending patent application works only when the index of refraction of the fiber cladding is less than the index of refraction of the fuel.

The physics of a fuel gauge as described in the pending application is shown in FIG. 1. Here, the fiber comprises a core 20 and cladding 22. The core is made of a material with index of refraction $n_1$, and the cladding of thickness d is made of a material with index of refraction $n_2$. The fiber is immersed in a liquid with index of refraction $n_3$. The light energy density profile in the fiber is indicated by line 24, with the darkened area under the line 24 indicating the light loss from the fiber due to the evanescent wave loss. The light intensity E in the cladding 22, the evanescent wave, decreases exponentially with increasing r, the distance from the core center.

$$E = E_0 e^{-\alpha r} \quad (1)$$

where $E_0$ is the core intensity (i.e., the intensity of light within the fiber core) and $\alpha$ is determined by the core and cladding indexes $n_1$ and $n_2$:

$$\alpha = (2\pi/\lambda)(n_1^2 - n_2^2)^{\frac{1}{2}} \quad (2)$$
$$\approx (2\pi/\lambda)(2n\Delta n)^{\frac{1}{2}} \quad (3)$$

where $\Delta n = n_1 - n_2$, and $n = (\frac{1}{2})(n_1 + n_2)$

Numerically, for $\lambda = 1$ μm, the index of refraction of the fiber core $n = 1.5$, and $\Delta n = 10^{-3}$ (the nominal values for an exemplary fiber), $$(1/\alpha) = 3 \text{ μm} \quad (4)$$

If the cladding thickness d is made small enough such that part of the wave extends outside the fiber and if the index of refraction of the liquid $n_3$ is larger than the cladding index $n_2$, some of the light is lost from the fiber. In case of $n_3 < n_2$ (for example, when the fiber in air) no light is coupled out. Therefore, the amount of light lost is an exponential function of the length of the fiber in the liquid and the quantity of fuel can be gauged.

Single mode fibers, however, cannot be made small enough ($\sim 15$ μm in diameter) to satisfy the condition that d be less than 5 μm. For this reason an eccentric core fiber is used, as depicted in FIG. 2. The fiber 30 comprises a core 32 surrounded by a cladding 34. The normal fiber diameter ($\sim 120$ μm) is retained for handling and mechanical strength purposes; however, the core 30 is placed close to the fiber surface such that $d < 5$ μm.

In an exemplary system as described in the referenced pending application and calibrated for $d \approx 3$ μm, about 75% of the light leaked out over a fiber length of six inches. It has been found that the light leak rate was very sensitive to the variations of d, the cladding thickness.

The condition $n_3 > n_2$ can be satisfied for diesel fuel and oils (where the index of refraction $n_3$ of the fuel and oils = 1.45, and the index $n_2 = 1.43$ for quartz cladding).

When gasoline is the liquid the condition $n_3 > n_2$ is not satisfied and no light leaks out of the fiber. The present invention overcome this difficulty.

It is an object of this invention to provide a fiber optic fuel gauge with no electrical parts in the fuel tank, to reduce the probability of unintentional ignition of the fuel.

SUMMARY OF THE INVENTION

In accordance with the invention, a fiber optic evanescent wave sensor system is described for measuring the level of a particular liquid in a container. The sensor system includes a light source for generating light at a wavelength band at which the liquid is highly absorptive. In a particular example, the container can be a vehicle fuel tank and the liquid may be a hydrocarbon fuel, such as gasoline. Typical absorptive bands are in the range of 1.16 to 1.22 micrometers, and between 1.36 and 1.42 micrometers.

The system further includes an optical fiber having one end into which the light from the light source is injected. The fiber further includes a sensing length of fiber extending into the liquid. The sensing length of fiber is characterized in that it comprises a core clad by a cladding layer of a material and thickness selected to provide significant evanescent wave loss of the light when immersed in the liquid.

Means are provided for determining the light loss from the sensing fiber due to evanescent wave loss and for processing the light loss to determine the level of the liquid in said container.

The invention is further embodied in a method for measuring the level of a known liquid in a container which comprises the steps of:

disposing an optical fiber into the liquid in the container;

injecting light into the fiber at a wavelength at which the liquid is highly absorptive, the fiber characterized in that it comprises a core clad by a cladding layer of a material and thickness selected to provide significant evanescent wave loss of the light when immersed in the liquid; and determining the evanescent wave loss of light passing through the fiber and processing the loss to determine the level of liquid in the container.

BRIEF DESCRIPTION OF THE DRAWING

These and other features and advantages of the present invention will become more apparent from the following detailed description of an exemplary embodiment thereof, as illustrated in the accompanying drawings, in which.

DETAILED DESCRIPTION OF THE PREFERRED EMBODIMENT

In accordance with the invention, one or more of the strong infrared absorption lines of hydrocarbons are used as the operational light wavelength of a fiber optic evanescent wave fluid level sensor. In this case, the light loss from the fiber is due to absorption of the evanescent wave in the fluid. This absorption occurs even when the index of the fluid is less than the index of the fiber. This can be seen from a crude model calculation.

The equation of propagation for a field E is approximately $$(\nabla^2\perp - k^2 \| + (\omega^2 n^2/c^2))E = 0$$

where $\omega$ is the frequency, $k \|$ is the wave number parallel to the fiber, $n$ is the index of refraction, $c$ is the speed of light, and $\nabla^2\perp$ is the Laplacian operator perpendicular to the fiber axis. If $(k^2\perp) \equiv (\omega^2 n^2/c^2) - k\|^2 > 0$, then light can propagate in the radial direction. In the invention of the referenced copending application, $k^2\perp > 0$ in the core and in the fluid and $k^2\perp < 0$ in the cladding. Thus, the light propagates, or leaks, out of the fiber into the fluid. However, in the event absorption occurs in the fluid, $$n = n_R + i n_I$$

where $n_R$ and $n_I$ are the real and imaginary parts of the index. In that case the signal diminishes not by virtue of propagation into the fluid, but simply by absorption of whatever field exists in the fluid. Hence, here it is unnecessary for the index of the fluid to be larger than that of the cladding.

The use of the fiber evanescent wave absorption simplifies the fuel gauge construction. The fuel gauge uses a light source (a semiconductor laser, superluminescent diode or an LED) with appropriate wavelength $\lambda$. For hydrocarbons, $\lambda \approx 1.2$ or $1.4$ $\mu$m. Since all hydrocarbons contain carbon-hydrogen (C—H) bonds that cause the absorption, such a fuel gauge is independent of the exact composition of the fuel (i.e., independent of whether the fuel is diesel, regular, high octane gas, etc.).

In accordance with the invention, light source wavelengths are employed where the absorption by gasoline is strong (1.16–1.22 and 1.36–1.42 $\mu$m), and where the absorption coefficient is larger than 1 cm$^{-1}$. Depending on the cladding thickness d, a 25 cm long fiber can be made to lose about 50% of light. The loss is independent of the exact chemical composition of the gasoline since the absorption coefficient at these wavelengths is associated with the C—H bond in hydrocarbons. Most importantly, this method is independent of the index of refraction of the gasoline.

Figure 1:
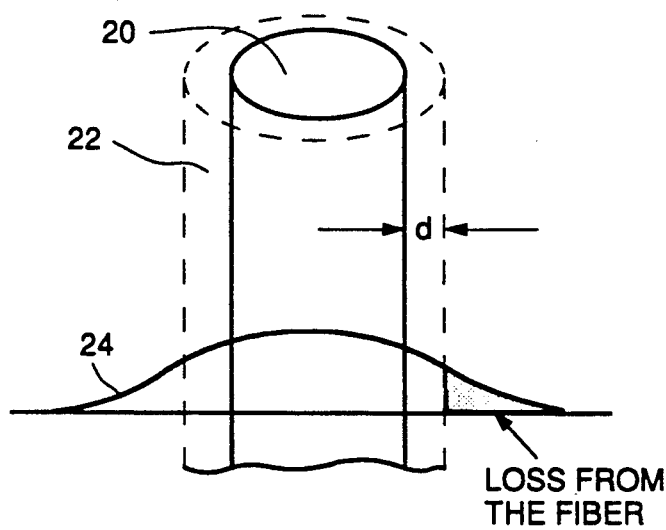
FIG. 1 is a simplified schematic diagram illustrative of the technique of employing evanescent wave losses from an optical fiber in a liquid to measure the liquid level.
Figure 2:
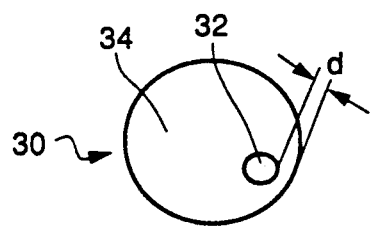
FIG. 2 is a cross-sectional view illustrating an eccentric core optical fiber.
Figure 3:
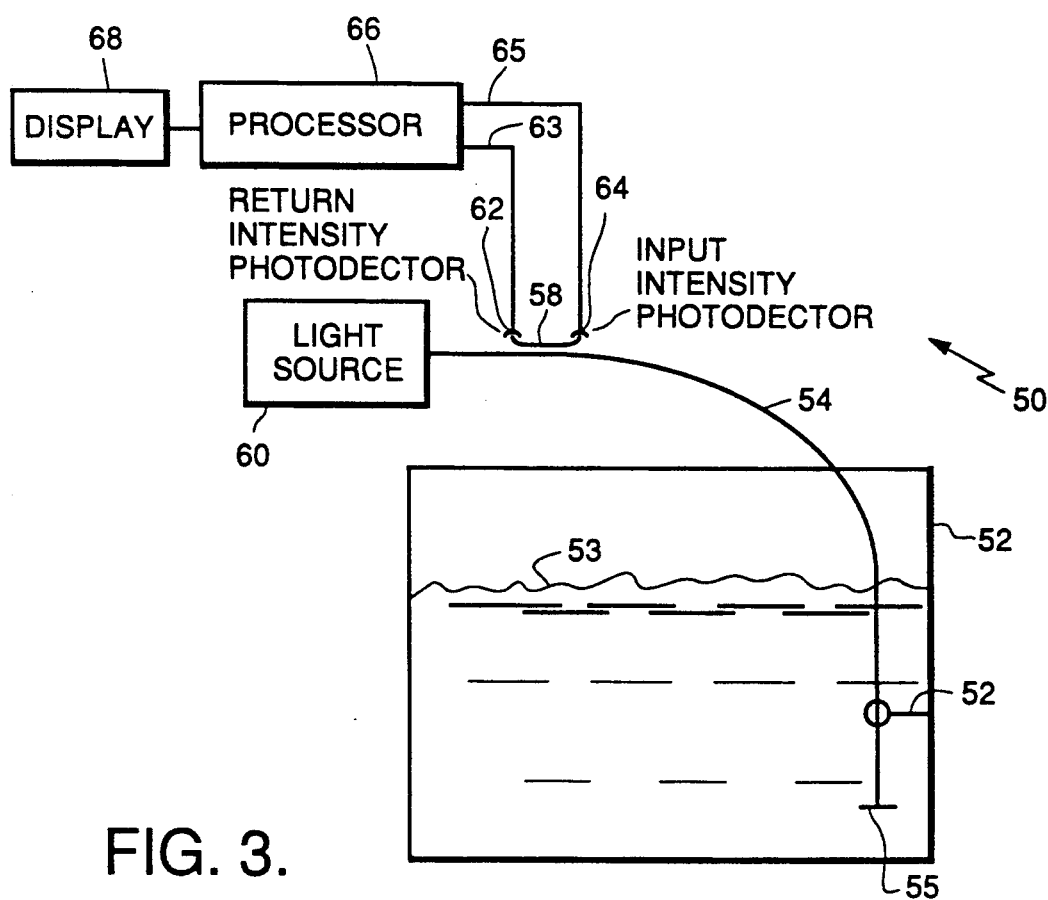
FIG. 3 is a simplified schematic diagram of a liquid level sensor system in accordance with the invention.

A simplified block diagram of a liquid level sensor 50 embodying this invention is shown in FIG. 3. This embodiment is for measuring the level of gasoline in a fuel tank 52. The sensor optical fiber 54 extends into the tank 52, and is secured adjacent a wall thereof by a fastener 56. Other arrangements may be used to secure the fiber in place, including gluing the fiber to the tank wall.

Light is injected into the optical fiber 54 by a light source 60. The operating wavelength is selected to be at one of the absorption lines for gasoline, such as 1.19 micrometers. An absorption line is a wavelength at which electromagnetic radiation is strongly absorbed by the molecule. In the case of gasoline, the lines of interest are caused by rotational or vibrational resonances of the molecules. The best absorption lines to use are those at which the liquid is strongly absorptive. Typically, these absorption lines have very large oscillator strengths, i.e., strong electric dipole moments. In an application in which it is desired to detect whether a particular substance is present, an absorptive line unique to that substance should be used. On the other hand, if the application requires one to detect whether a particular class of substances is present, then a line at which all substances in this class are strongly absorptive should be used, if such a line exists.

Figure 4:
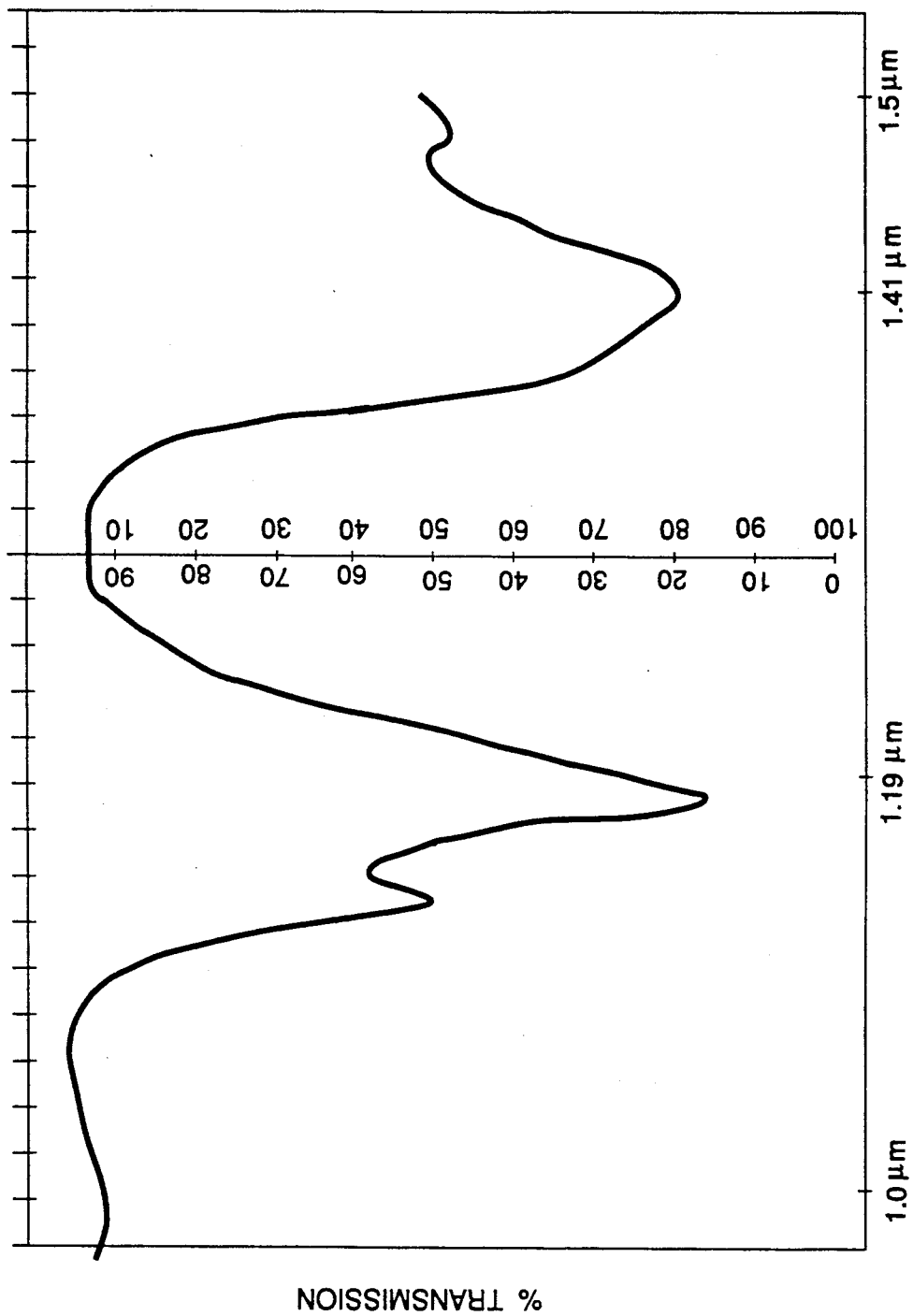
FIG. 4 is a graph illustrating a typical absorptive spectrum of gasoline from 1.0 micrometers to 1.50 micrometers.

The absorptive lines for a particular substance can be determined by measurement, or by consulting published handbooks which include tabulations of resonant wavelengths for different substances. FIG. 4 shows a graph illustrative of a typical absorption spectrum of gasoline from 1.0 micrometer to 1.5 micrometer. The horizontal axis indicates the wavelength in micrometers, and the vertical axis indicates percent transmission. Peak absorption bands occur at wavelengths of approximately 1.2 micrometers and 1.4 micrometers and having bandwidths of about 50 nanometers.

A light source 60 capable of operating at such a wavelength is readily available, such as a semiconductor laser; suitable lasers are available from Laser Diode, New Brunswick, N.J. To provide a means of measuring the ratio of the intensity of the input light to the return light, an optical beamsplitter 58 splits off a portion of the input light to a first photodetector 64. This photodetector provides an electrical output signal indicative of the intensity of the input light provided by the source 60. The beamsplitter also splits off a portion of the light reflected at the fiber end 55 to the second photodetector 62. This second photodetector provides an electrical signal indicative of the intensity of the returned light which has traversed the fiber twice.

The photodetector signals are provided to a processor 66 which converts the ratio of the two intensities into a level value which is displayed by the display 68, which may be a digital readout or an analog display such as a conventional fuel gauge.

The invention is further embodied in a method for measuring the level of a known liquid in a container which comprises the steps of:

disposing an optical fiber into the liquid in the container;

injecting light into the fiber at a wavelength at which the liquid is highly absorptive, the fiber characterized in that it comprises a core clad by a cladding layer of a material and thickness selected to provide significant evanescent wave loss of the light when immersed in the liquid; and determining the evanescent wave loss of light passing through the fiber and processing the loss to determine the level of liquid in the container.

It is understood that the above-described embodiments are merely illustrative of the possible specific embodiments which may represent principles of the present invention. Other arrangements may readily be devised in accordance with these principles by those skilled in the art without departing from the scope and spirit of the invention.

What is claimed is:

1. A fiber optic evanescent wave sensor system for measuring the level of a particular liquid in a container, comprising:

a light source for generating light at a wavelength band at which said liquid is highly absorptive;

an optical fiber having a first end into which the light from said source is injected, said fiber further comprises a sensing length of fiber and a second end from which said injected light is reflected disposed in said liquid, said sensing length of fiber characterized in that it comprises an eccentric core clad by a cladding layer of a material said eccentric core cladding layer being of a thickness selected to provide significant evanescent wave loss of said light when immersed in said liquid; and means responsive to the intensity of the light injected into said fiber and to the intensity of said reflected light for determining the light loss from the sensing fiber due to evanescent wave loss and for processing said light loss to determine the level of said liquid in said container.

2. The sensor system of claim 1 wherein said liquid is gasoline, and said wavelength band is a band at which gasoline is highly absorptive.

3. The sensor system of claim 2 wherein said wavelength band is 1.16 to 1.22 micrometers.

4. The sensor system of claim 2 wherein said wavelength band is 1.36 to 1.42 micrometers.

5. The sensor system of claim 1 wherein said sensing length of fiber is characterized by an eccentric core.

6. The sensor system of claim 1 wherein said means for determining the light loss from said fiber comprises a fiber beamsplitter for splitting a portion of the input light to a first photodetector for indicating the intensity of the input light injected into the first end of the fiber, and for splitting a portion of the return light to a second photodetector for indicating the intensity of the return light.

7. The sensor system of claim 1 wherein said liquid is a hydrocarbon, and wherein said absorptive wavelength band is selected in dependence on carbon-hydrogen bands of said hydrocarbons which cause the absorption.

8. A method for measuring the level of a known liquid in a container, comprising the steps of:

disposing an optical fiber having a reflective end into the liquid in the container;

injecting light into said fiber at a wavelength at which said liquid is highly absorptive, said fiber characterized in that it comprises an eccentric core clad by a cladding layer of an eccentric core cladding material being of a thickness selected to provide significant evanescent wave loss of said light when immersed in said liquid; and providing an indication of the intensity of the injected light;

providing an indication of the intensity of the injected light reflected at said reflective end and which has traversed the portion of said fiber immersed in said liquid;

determining from said indication of said respective injected light intensity and said reflected light intensity the evanescent wave loss of light passing through said fiber and processing said loss to determine the level of said liquid in said container.

9. The method of claim 8 wherein said liquid is a hydrocarbon, and wherein said absorptive wavelength band is selected in dependence on carbon-hydrogen bonds of said hydrocarbons which cause the absorption.

10. The method of claim 8 wherein said liquid is gasoline, and said wavelength band is a band at which gasoline is highly absorptive.

11. The method of claim 10 wherein said wavelength band is 0.85 to 0.95 micrometers.

12. The method of claim 10 wherein said wavelength band is 1.10 to 1.15 micrometers.

13. A fuel lever sensor for measuring the level of hydrocarbon fuel in a vehicle fuel tank, comprising:

a light source for generating light at a wavelength band at which the fuel is highly absorptive, said band being dependent on the carbon-hydrogen bonds of the hydrocarbon fuel;

an optical fiber having a first end into which the light from said source in injected, and a sensing length of fiber and a second end from which said injected light is reflected disposed in said fuel tank and into said fuel, said sensing length of fiber characterized in that it comprises eccentric core clad by a cladding layer of a material being of a thickness selected to provide significant evanescent wave loss of said light when immersed in said fuel;

means for measuring the intensity of said injected light;

means for measuring the intensity of said reflected light; and means responsive to the intensity of the light injected into said fiber and to the intensity of said reflected light for determining the light loss from the sensing fiber due to evanescent wave loss and processing said light loss to determine the level of said liquid in said container.

* * * * *